United States Patent
Li et al.

(10) Patent No.: US 11,386,861 B2
(45) Date of Patent: Jul. 12, 2022

(54) LIQUID CRYSTAL ON SILICON PANEL WITH SUBPIXEL WOBULATION

(71) Applicant: Himax Display, Inc., Tainan (TW)

(72) Inventors: Yuet-Wing Li, Tainan (TW); Shun-Tai Huang, Tainan (TW)

(73) Assignee: Himax Display, Inc., Tainan (TW)

( * ) Notice: Subject to any disclaimer, the term of this patent is extended or adjusted under 35 U.S.C. 154(b) by 62 days.

(21) Appl. No.: 17/083,313

(22) Filed: Oct. 29, 2020

(65) Prior Publication Data

US 2021/0358436 A1    Nov. 18, 2021

Related U.S. Application Data

(60) Provisional application No. 63/023,830, filed on May 12, 2020.

(51) Int. Cl.
| | |
|---|---|
| *G09G 3/36* | (2006.01) |
| *G02F 1/1362* | (2006.01) |
| *G03B 21/00* | (2006.01) |
| *G02B 27/28* | (2006.01) |

(52) U.S. Cl.
CPC ......... *G09G 3/3648* (2013.01); *G02B 27/283* (2013.01); *G02F 1/136277* (2013.01); *G03B 21/006* (2013.01); *G09G 2300/0842* (2013.01)

(58) Field of Classification Search
CPC ......... G09G 2300/0842; G09G 3/3648; G09G 3/002; G09G 2354/00; G09G 2340/0457; G09G 2340/145; G02B 27/283; G02F 1/136277; G03B 21/006
See application file for complete search history.

(56) References Cited

U.S. PATENT DOCUMENTS

| | | | | |
|---|---|---|---|---|
| 2005/0243290 A1* | 11/2005 | Gupta | .................. | G03B 21/005 348/E9.027 |
| 2007/0024811 A1* | 2/2007 | Piehl | ..................... | G03B 33/08 353/30 |
| 2007/0132691 A1 | 6/2007 | Koyama et al. | | |
| 2010/0328561 A1* | 12/2010 | Schuck | .................. | G02B 30/25 349/9 |

FOREIGN PATENT DOCUMENTS

| | | |
|---|---|---|
| CN | 109036248 | 12/2018 |
| TW | 201919029 | 5/2019 |

OTHER PUBLICATIONS

"Office Action of Taiwan Counterpart Application", dated Apr. 14, 2022, p. 1-p. 7.

* cited by examiner

*Primary Examiner* — Muhammad N Edun
(74) *Attorney, Agent, or Firm* — JCIPRNET

(57) ABSTRACT

A liquid crystal on silicon panel including a plurality of driving circuits is provided. Each of the driving circuits includes a first driving route and a second driving route. The first driving route and the second driving route are configured to drive corresponding subpixel electrodes and respectively determine display content of a first wobulation image and a second wobulation image. In addition, a projection apparatus including the liquid crystal on silicon panel is also provided.

14 Claims, 6 Drawing Sheets

LIQUID CRYSTAL ON SILICON PANEL WITH SUBPIXEL WOBULATION

CROSS-REFERENCE TO RELATED APPLICATION

This application claims the priority benefit of U.S. provisional application Ser. No. 63/023,830, filed on May 12, 2020. The entirety of the above-mentioned patent application is hereby incorporated by reference herein and made a part of this specification.

BACKGROUND

Technical Field

The invention generally relates to a liquid crystal on silicon (LCoS) panel and a projection apparatus. More particularly, the invention relates to a LCoS panel with subpixel wobulation and a projection apparatus including the LCoS panel.

Description of Related Art

LCoS is a miniaturized reflective active-matrix liquid-crystal display or microdisplay using a liquid crystal layer on top of a silicon backplane. It is also referred to as a spatial light modulator. LCoS was initially developed for projection televisions but is now used for wavelength selective switching, structured illumination, near-eye displays and optical pulse shaping. A size of the LCoS display highly correlates to pixel size. In order to obtain tiny display module, pixel size shrinkage is the only way. Some projector vendors proposed an e-shift device which can shift the display screen by half pixel distance to increase the image resolution. It is called as optical wobulation. However, the e-shift device is too big for argument reality (AR) applications.

SUMMARY

The invention is directed to a LCoS panel with subpixel wobulation and a projection apparatus including the LCoS panel. A size of the projection apparatus including the LCoS panel is small, and the projection apparatus can provide a high image resolution.

In an embodiment of the invention, a liquid crystal on silicon panel includes a plurality of driving circuits. Each of the driving circuits includes a first driving route and a second driving route. The first driving route and the second driving route are configured to drive corresponding subpixel electrodes and respectively determine display content of a first wobulation image and a second wobulation image.

In an embodiment of the invention, a projection apparatus includes a light source, a liquid crystal on silicon panel, a plurality of driving circuits, a beam splitter device and a projection lens device. The light source is configured to output an illumination beam. The liquid crystal on silicon panel is configured to convert the illumination beam into an image beam and output the image beam. The image beam includes display content of a first wobulation image and a second wobulation image. The liquid crystal on silicon panel includes a plurality of driving circuits. Each of the driving circuits includes a first driving route and a second driving route. The first driving route and the second driving route are configured to drive corresponding subpixel electrodes and respectively determine the display content of the first wobulation image and the second wobulation image. The beam splitter device is configured to control light polarization of the image beam and output the polarized image beam. The projection lens device is configured to output the polarized image beam to form a projection image.

In an embodiment of the invention, the first driving route and the second driving route operate in different phases.

In an embodiment of the invention, when the first driving route operates in a data loading phase, the second driving route operates in a display phase. When the first driving route operates in the display phase, the second driving route operates in the data loading phase.

In an embodiment of the invention, the first driving route drives a plurality of first subpixel electrodes, and the second driving route drives a plurality of second subpixel electrodes. At least one of the first subpixel electrodes is the same as at least one of the second subpixel electrodes.

In an embodiment of the invention, a part of the subpixel electrodes is coupled to the first driving route and the second driving route. The first driving route and the second driving route are selected from the same driving circuit or two different driving circuits.

In an embodiment of the invention, the display content of the first wobulation image and the second wobulation image is the same or different.

In an embodiment of the invention, each of the first driving route and the second driving route includes at least two switch circuits and a capacitor circuit.

In an embodiment of the invention, the at least two switch circuits of the first driving route include a first switch circuit and a second switch circuit, and the capacitor circuit of the first driving route includes a first storage capacitor. The first switch circuit is turned on and the second switch circuit is turned off in a data loading phase, and a pixel voltage is latched in the first storage capacitor. The first switch circuit is turned off and the second switch circuit is turned on in a display phase, and the pixel voltage latched in the first storage capacitor is transmitted to drive a plurality of first subpixel electrodes. The display phase is after the data loading phase.

In an embodiment of the invention, the at least two switch circuits of the second driving route include a third switch circuit and a fourth switch circuit, and the capacitor circuit of the second driving route includes a second storage capacitor. The third switch circuit is turned on and the fourth switch circuit is turned off in the data loading phase, and the pixel voltage is latched in the second storage capacitor. The third switch circuit is turned off and the fourth switch circuit is turned on in the display phase, and the pixel voltage latched in the second storage capacitor is transmitted to drive a plurality of second subpixel electrodes.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
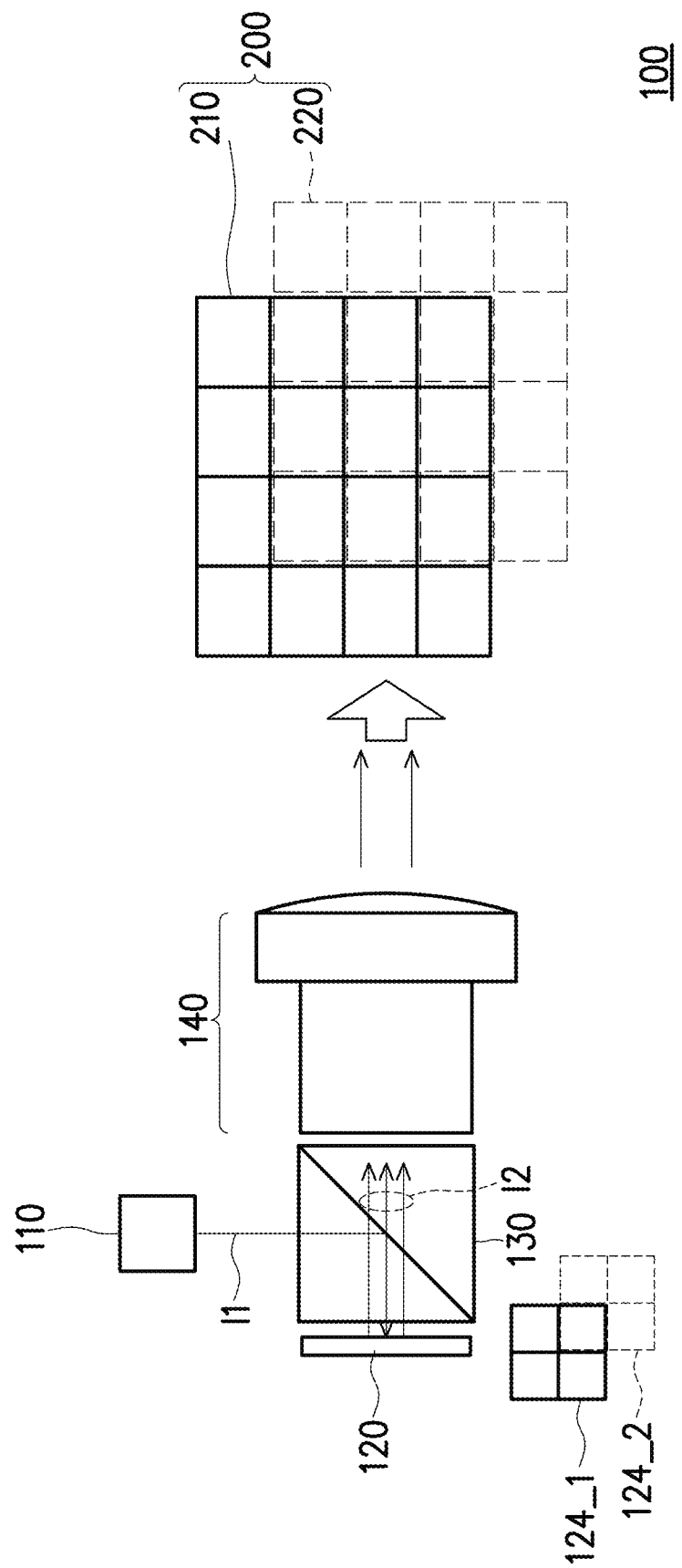
FIG. 1 illustrates a schematic diagram of a projection apparatus according to an embodiment of the invention.

FIG. 1 illustrates a schematic diagram of a projection apparatus according to an embodiment of the invention. Referring to FIG. 1, a projection apparatus 100 of the present embodiment includes a light source 110, a liquid crystal on silicon (LCoS) panel 120, a beam splitter device 130 and a projection lens device 140. The projection apparatus 100 projects the first wobulation image 210 and the second wobulation image 220 to an object (not illustrated in FIG. 1) to form a projection image 200 with high resolution. The object may be a screen or human eyes, but the invention is not limited thereto.

To be specific, the light source 110 is configured to output an illumination beam I1 to the beam splitter device 130. The beam splitter device 130 is configured to receive the illumination beam I1 and reflect the illumination beam I1 having a first polarization to the LCoS panel 120. The LCoS panel 120 is configured to convert the illumination beam I1 into an image beam I2 and outputs the image beam I2 to the beam splitter device 130.

The beam splitter device 130 transmits the image beam I2 having a second polarization to the projection lens device 140. In other words, the beam splitter device 130 can controls light polarization of the image beam I2 and outputs the polarized image beam I2 to the projection lens device 140. In the present embodiment, the beam splitter device 130 may be a polarizing beamsplitters (PBS) for reflecting the first polarization and transmitting the second polarization. For example, the beam splitter device 130 reflects beams with the S-polarization and transmits beams with the P-polarization, but the invention is not limited thereto.

The projection lens device 140 is configured to output the polarized image beam I2 to form the projection image 200. In an embodiment, the projection lens device 140 may include a collimator and/or one or more lens groups to process and transmit the image beam I2. The image beam I2 includes display content of the first wobulation image 210 and the second wobulation image 220. Therefore, the first wobulation image 210 and the second wobulation image 220 are projected to the object to form the projection image 200.

In addition, the LCoS panel 120 includes a plurality of pixels. Two pixels 124_1 and 124_2 are illustrated in FIG. 1, for example, and each of the pixels 124_1 and 124_2 includes four subpixels. Two pixels 124_1 and 124_2 show the display image is actually shifted by half pixel within the LCoS panel 120.

In the present embodiment, the LCoS panel 120 sequentially displays the first wobulation image 210 and the second wobulation image 220. Every wobulation image may show different color image. Since there are three elementary colors, e.g. red, green and blue, two wobulation images and two polarity frames, the display cycle includes 12 frames. It requires more than 30 cycles per second to make a flicker free and smooth display. Therefore, the projection apparatus 100 requires more than 360 frames per second to the projection image 200.

Figure 2:
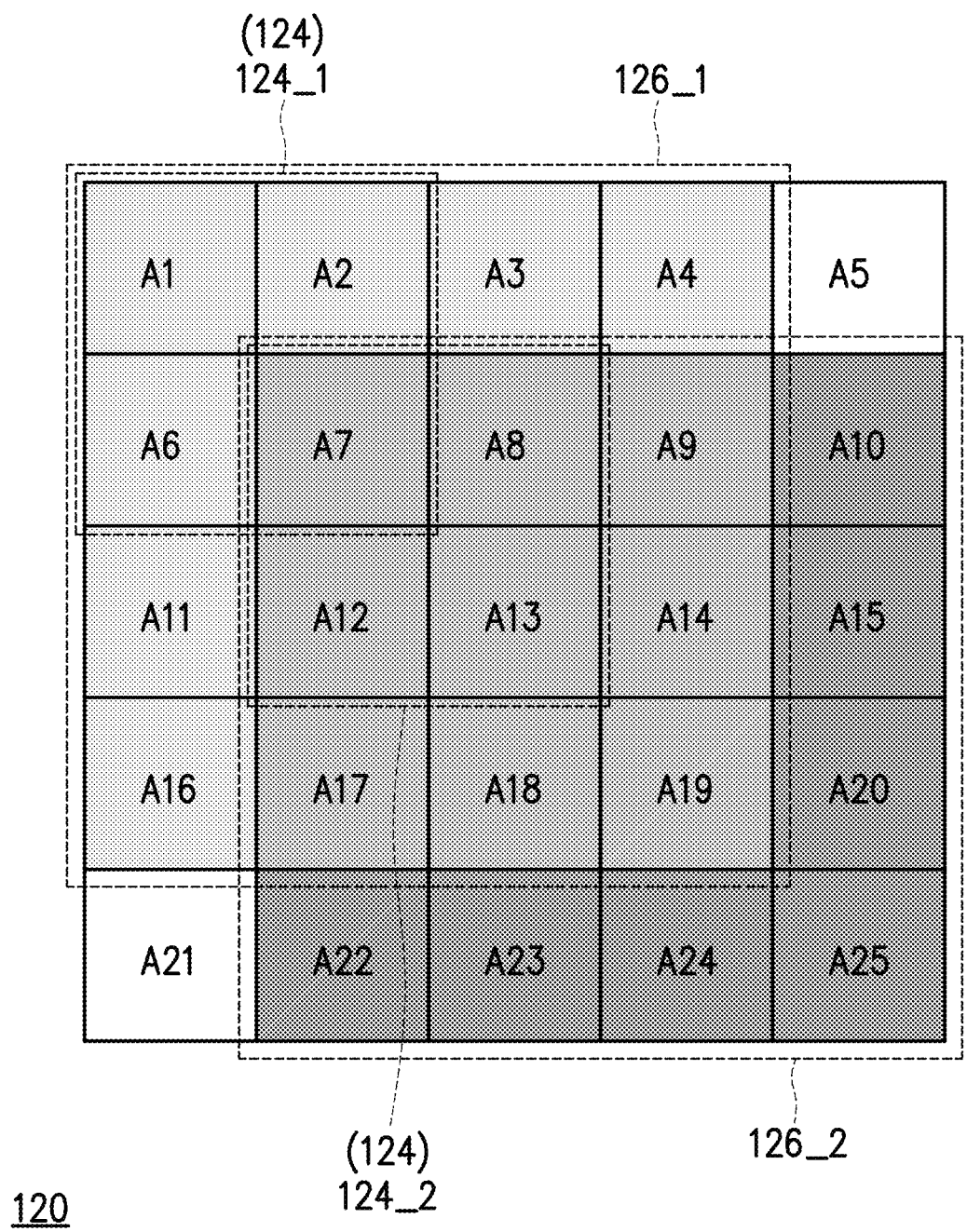
FIG. 2 illustrates a schematic diagram of the LCoS panel including a plurality of pixels according to an embodiment of the invention.
Figure 3:
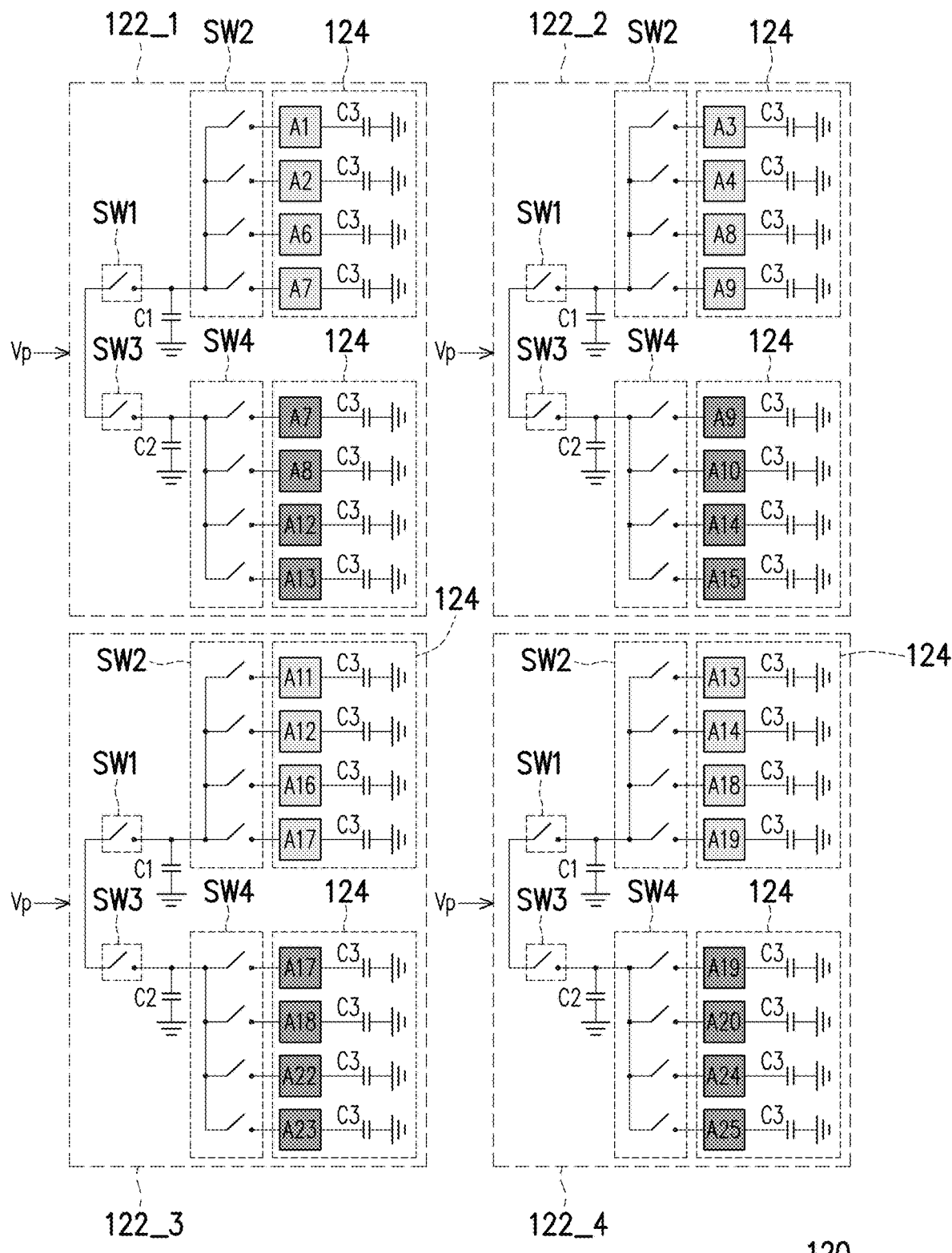
FIG. 3 illustrates a schematic diagram of driving circuits of the LCoS panel according to an embodiment of the invention.

FIG. 2 illustrates a schematic diagram of the LCoS panel including a plurality of pixels according to an embodiment of the invention. FIG. 3 illustrates a schematic diagram of driving circuits of the LCoS panel according to an embodiment of the invention. Referring to FIG. 2 and FIG. 3, the LCoS panel 120 includes a plurality of pixels 124. Each of the pixels 124 includes four subpixels. For example, subpixel electrodes A1, A2, A6 and A7 illustrated in FIG. 2 indicate the pixel 124_1 includes four subpixels. The pixel group 126_1 includes a plurality of first subpixel electrodes A1-A4, A6-A9, A11-A14 and A16-A19 and displays the first wobulation image 210. The pixel group 126_2 includes a plurality of second subpixel electrodes A7-A10, A12-A15, A17-A20 and A22-A25 displays the second wobulation image 220.

The LCoS panel 120 includes a plurality of driving circuits 122_1, 122_2, 122_3 and 122_4. In a first data loading phase, pixel voltages Vp are latched in the first storage capacitors C1 of each driving circuit. In a first display phase, the pixel voltages Vp latched in the first storage capacitors C1 are transmitted to drive the pixel group 126_1 to display the first wobulation image 210, where the first display phase is after the first data loading phase. Similarly, in a second data loading phase, pixel voltages Vp are latched in the second storage capacitors C2 of each driving circuit. In a second display phase, the pixel voltages Vp latched in the second storage capacitors C2 are transmitted to drive the pixel group 126_2 to display the second wobulation image 220, where the second display phase is after the second data loading phase.

It should be noted that when the pixel voltages Vp are latched in the first storage capacitors C1, the pixel voltages Vp latched in the second storage capacitors C2 are transmitted to drive the pixel group 126_2. On the other hand, when the pixel voltages Vp are latched in the second storage capacitors C2, the pixel voltages Vp latched in the first storage capacitors C1 are transmitted to drive the pixel group 126_1.

Figure 4:
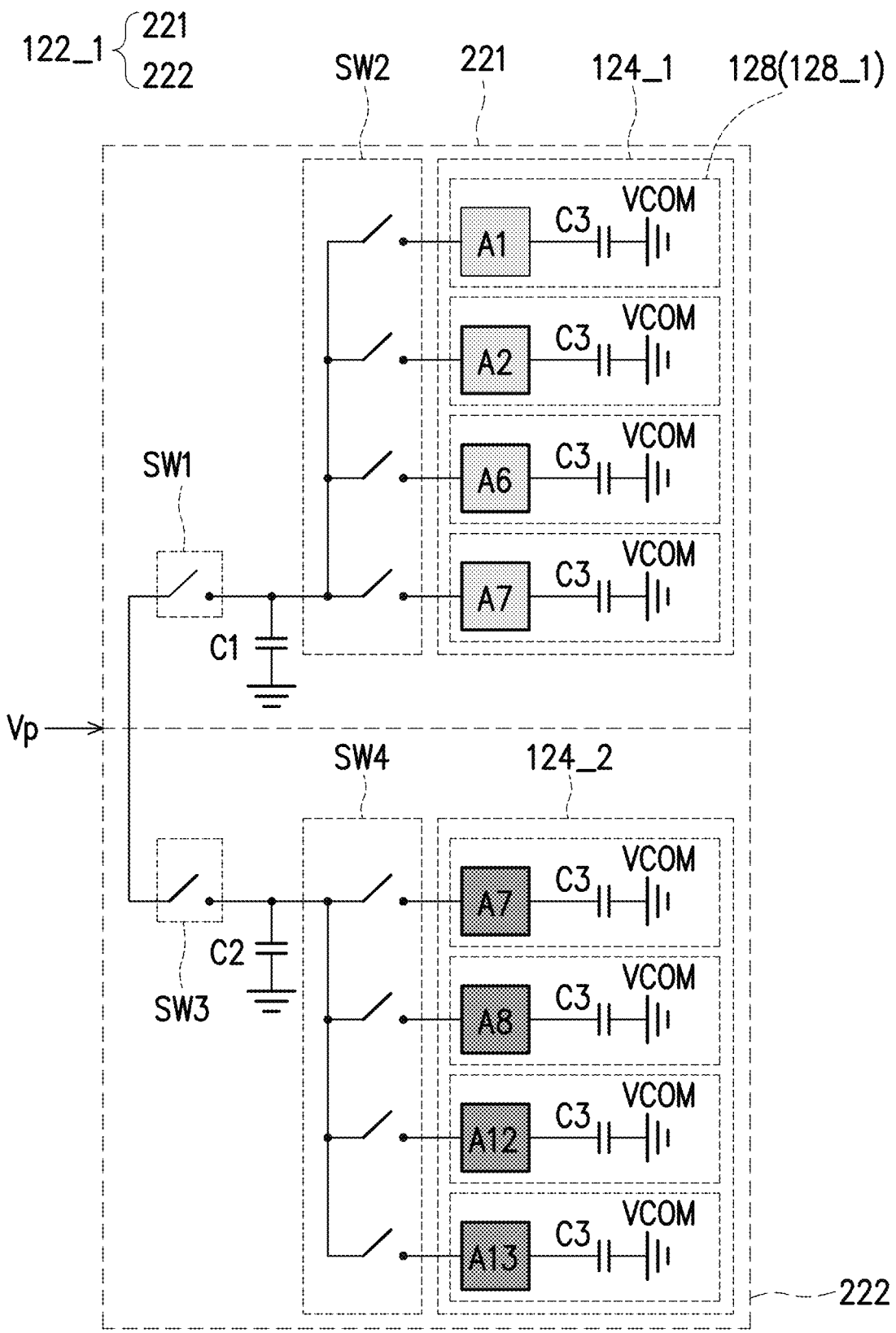
FIG. 4 illustrates a schematic diagram of the driving circuit.
Figure 5:
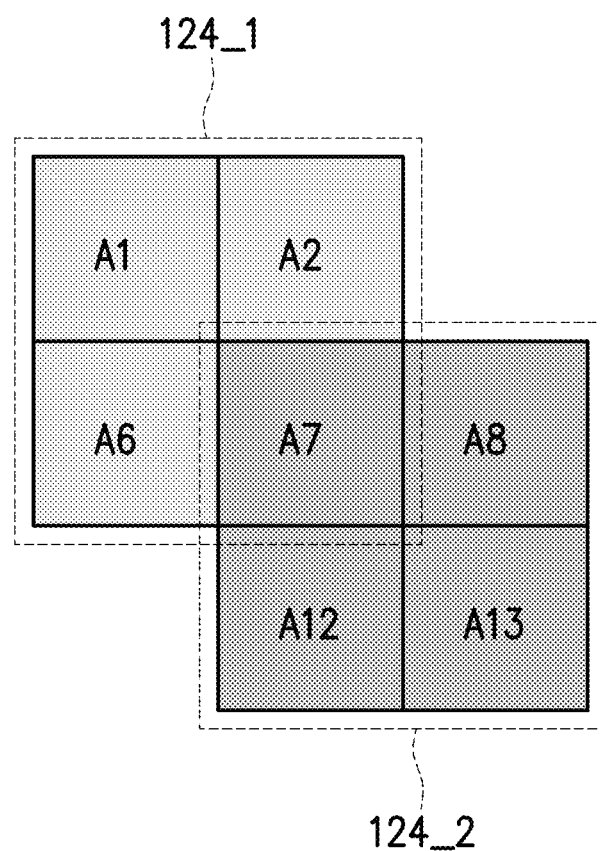
FIG. 5 illustrates a schematic diagram of the two pixels that are driven by the driving circuit.

In the present embodiment, each of the driving circuits includes a first driving route and a second driving route. Taking the driving circuit 122_1 for example, the driving circuit 122_1 includes a first driving route 221 and a second driving route 222 as illustrated in FIG. 4. FIG. 4 illustrates a schematic diagram of the driving circuit 122_1, and FIG. 5 illustrates a schematic diagram of the two pixels 124_1 and 124_2 that are driven by the driving circuit 122_1. Referring to FIG. 4 and FIG. 5, the first driving route 221 and the second driving route 222 are configured to drive corresponding subpixel electrodes according to the pixel voltages Vp and respectively determine display content of the first wobulation image 210 and the second wobulation image 220.

For example, the first driving route 221 drives the first subpixel electrodes A1, A2, A6 and A7 according to the pixel voltages Vp in the first display phase, such that corresponding subpixels display images. Therefore, the display content of the first wobulation image 210 can be determined. Similarly, the second driving route 222 drives the second subpixel electrodes A7, A8, A12 and A13 according to the pixel voltages Vp in the second display phase different from the first display phase, such that corresponding subpixels display images. Therefore, the display content of the second wobulation image 220 can be determined. In the present embodiment, at least one of the first subpixel electrodes is the same as at least one of the second subpixel electrodes.

For example, the subpixel electrode A7 of the first subpixel electrodes A1, A2, A6 and A7 is the same as the subpixel electrode A7 of the second subpixel electrodes A7, A8, A12 and A13.

In addition, the subpixel electrode A7 is coupled to the first driving route 221 and the second driving route 222 that are located in the same driving circuit 122_1. The first driving route 221 and the second driving route 222 are selected from the same driving circuit 122_1, but the invention is not limited thereto. The first driving route and the second driving route may be selected from two different driving circuits. For example, the subpixel electrode A8 is coupled to the first driving route of the driving circuits 122_2 and the second driving route of the driving circuits 122_1 as illustrated in FIG. 3. The first driving route of the driving circuits 122_2 and the second driving route of the driving circuits 122_1 are selected from two different driving circuits. The subpixel electrode A12 is coupled to the first driving route of the driving circuits 122_3 and the second driving route of the driving circuits 122_1 as illustrated in FIG. 3. The first driving route of the driving circuits 122_3 and the second driving route of the driving circuits 122_1 are selected from two different driving circuits. The subpixel electrode A13 is coupled to the first driving route of the driving circuits 122_4 and the second driving route of the driving circuits 122_1 as illustrated in FIG. 3. The first driving route of the driving circuits 122_4 and the second driving route of the driving circuits 122_1 are selected from two different driving circuits. That is to say, the subpixel electrodes A7-A9, A12-14 and A17-A19 (a part of the subpixel electrodes A1-A25) are coupled to the first driving route and the second driving route, and the first driving route and the second driving route are selected from the same driving circuit or two different driving circuits.

The pixels 124_1 and 124_2 respectively include four subpixels 128. Each of the subpixels 128 includes a pixel capacitor C3 coupled between a subpixel electrode and a common electrode. For example, the subpixel 128_1 includes the pixel capacitor C3 coupled between the subpixel electrode A1 and the common electrode VCOM.

In the present embodiment, each of the first driving route and the second driving route includes at least two switch circuits and a capacitor circuit. For example, the first driving route 221 includes two switch circuits SW1 and SW2 and a capacitor circuit C1, and the capacitor circuit C1 includes a storage capacitor (a first storage capacitor). The second driving route 222 includes two switch circuits SW3 and SW4 and a capacitor circuit C2, and the capacitor circuit C2 includes a storage capacitor (a second storage capacitor). The number of the switch circuits, and the number of capacitor circuits do not intend to limit the invention.

In the present embodiment, the first driving route 221 and the second driving route 222 operate in different phases. When the first driving route 221 operates in the data loading phase, the second driving route operates in the display phase. When the first driving route 221 operates in the display phase, the second driving route 222 operates in the data loading phase. In other words, the first driving route 221 and the second driving route 222 does not operate in the same phase.

To be specific, for the first driving route 221, the first switch circuit SW1 is turned on and the second switch circuit SW2 is turned off in the data loading phase, and a pixel voltage Vp is latched in the first storage capacitor C1. Next, the first switch circuit SW1 is turned off and the second switch circuit SW is turned on in the display phase, and the pixel voltage Vp latched in the first storage capacitor C1 is transmitted to drive the first subpixel electrodes A1, A2, A6 and A7. The display phase is after the data loading phase.

When the first driving route 221 operates in the display phase, the second driving route operates in the data loading phase. For the second driving route 222, the third switch circuit SW3 is turned on and the fourth switch circuit SW4 is turned off in the data loading phase, and the pixel voltage Vp is latched in the second storage capacitor C2. Next, the third switch circuit SW3 is turned off and the fourth switch circuit SW4 is turned on in the display phase, and the pixel voltage Vp latched in the second storage capacitor C2 is transmitted to drive the second subpixel electrodes A7, A8, A12 and A13.

In FIG. 5, the subpixel electrodes A1, A2, A6 and A7 in the first driving route 221 are not completely the same as the subpixel electrodes A7, A8, A12 and A13 in the second driving route 222. In the present embodiment, the pixel 124_2 is shifted by one subpixel relative to the pixel 124_1. In an embodiment, the shifting can be more than one subpixel. The shifting can be horizontal, vertical or diagonal.

Figure 6C:
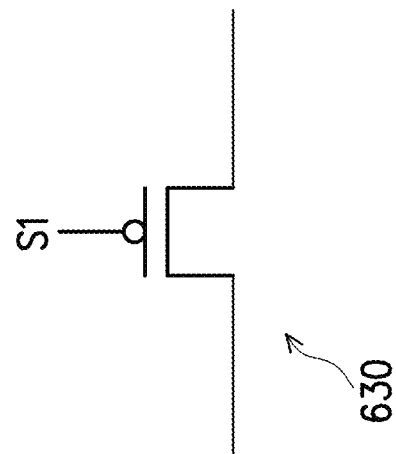
FIG. 6A, FIG. 6B and FIG. 6C illustrate schematic diagrams of switch devices according to different embodiments of the invention.
Figure 6B:
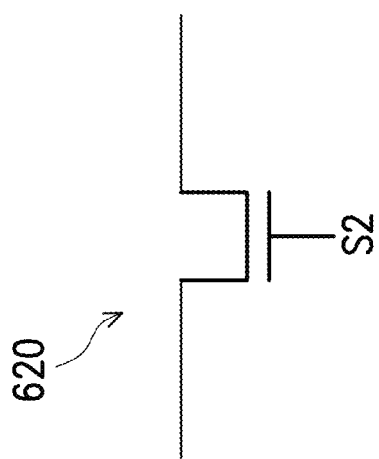
Figure 6A:
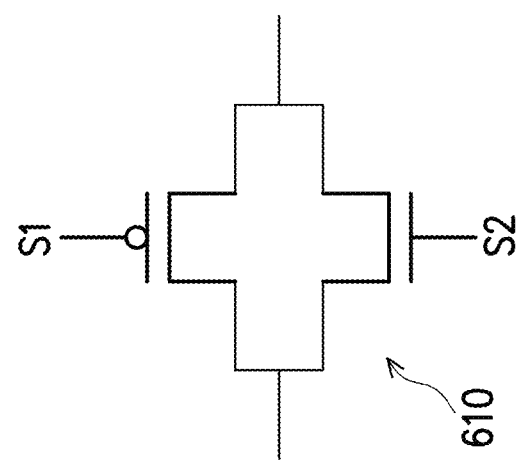

FIG. 6A, FIG. 6B and FIG. 6C illustrate schematic diagrams of switch devices according to different embodiments of the invention. Referring to FIG. 4, FIG. 6A, FIG. 6B and FIG. 6C, the switch circuit SW1, SW2, SW3 or SW4 may include one or more switch devices 610, 620 or 630. The number of the switch devices of the switch circuits SW1, SW2, SW3 or SW4 does not intend to limit the invention. The switch device 610 is a switch of CMOS (Complementary Metal-Oxide-Semiconductor) type and controlled by control signals S1 and S2. The switch device 620 is a switch of NMOS (N-Metal-Oxide-Semiconductor) type and controlled by the control signal S2. The switch device 630 is a switch of PMOS (P-Metal-Oxide-Semiconductor) type and controlled by the control signal S1.

In summary, in exemplary embodiments of the invention, an in-cell vibration method is provided. Every pixel includes four subpixels. By introducing new backplane circuitry design and timing control, the display image is actually shifted by half pixel within the LCoS panel. By using such method, an external e-shift device can be removed, and the projection apparatus can be as small as an ordinary AR projection system. No additional optical device is required to achieve the subpixel wobulation in the exemplary embodiments of the invention. Therefore, the size of the projection apparatus including the LCoS panel is small, and the projection apparatus can provide a high image resolution.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A liquid crystal on silicon panel, comprising:
a plurality of driving circuits, each of the driving circuits comprising a first driving route and a second driving route, wherein the first driving route and the second driving route are configured to drive corresponding subpixel electrodes and respectively determine display content of a first wobulation image and a second wobulation image,
wherein the first driving route and the second driving route operate in different phases, wherein when the first driving route operates in a data loading phase, the second driving route operates in a display phase; and when the first driving route operates in the display phase, the second driving route operates in the data loading phase.

2. The liquid crystal on silicon panel of claim 1, wherein the first driving route drives a plurality of first subpixel electrodes, the second driving route drives a plurality of second subpixel electrodes, and at least one of the first subpixel electrodes is the same as at least one of the second subpixel electrodes.

3. The liquid crystal on silicon panel of claim 1, wherein a part of the subpixel electrodes is coupled to the first driving route and the second driving route, and the first driving route and the second driving route are selected from the same driving circuit or two different driving circuits.

4. The liquid crystal on silicon panel of claim 1, wherein the display content of the first wobulation image and the second wobulation image is the same or different.

5. The liquid crystal on silicon panel of claim 1, wherein each of the first driving route and the second driving route comprises at least two switch circuits and a capacitor circuit.

6. The liquid crystal on silicon panel of claim 5, wherein the at least two switch circuits of the first driving route comprise a first switch circuit and a second switch circuit, the capacitor circuit of the first driving route comprises a first storage capacitor, and the first switch circuit is turned on and the second switch circuit is turned off in the data loading phase, and a pixel voltage is latched in the first storage capacitor, and the first switch circuit is turned off and the second switch circuit is turned on in the display phase, and the pixel voltage latched in the first storage capacitor is transmitted to drive a plurality of first subpixel electrodes, wherein the display phase is after the data loading phase.

7. The liquid crystal on silicon panel of claim 6, wherein the at least two switch circuits of the second driving route comprise a third switch circuit and a fourth switch circuit, the capacitor circuit of the second driving route comprises a second storage capacitor, and the third switch circuit is turned on and the fourth switch circuit is turned off in the data loading phase, and the pixel voltage is latched in the second storage capacitor, and the third switch circuit is turned off and the fourth switch circuit is turned on in the display phase, and the pixel voltage latched in the second storage capacitor is transmitted to drive a plurality of second subpixel electrodes.

8. A projection apparatus, comprising:

a light source, configured to output an illumination beam;

a liquid crystal on silicon panel, configured to convert the illumination beam an image beam and output the image beam, wherein the image beam comprises display content of a first wobulation image and a second wobulation image, and the liquid crystal on silicon panel comprises:

a plurality of driving circuits, each of the driving circuits comprises a first driving route and a second driving route, the first driving route and the second driving route are configured to drive corresponding subpixel electrodes and respectively determine the display content of the first wobulation image and the second wobulation image;

a beam splitter device, configured to control light polarization of the image beam and output the polarized image beam; and a projection lens device, configured to output the polarized image beam to form a projection image, wherein the first driving route and the second driving route operate in different phases, wherein when the first driving route operates in a data loading phase, the second driving route operates in a display phase; and when the first driving route operates in the display phase, the second driving route operates in the data loading phase.

9. The projection apparatus of claim 8, wherein the first driving route drives a plurality of first subpixel electrodes, the second driving route drives a plurality of second subpixel electrodes, and at least one of the first subpixel electrodes is the same as at least one of the second subpixel electrodes.

10. The projection apparatus of claim 8, wherein a part of the subpixel electrodes is coupled to the first driving route and the second driving route, and the first driving route and the second driving route are selected from the same driving circuit or two different driving circuits.

11. The projection apparatus of claim 8, wherein the display content of the first wobulation image and the second wobulation image is the same or different.

12. The projection apparatus of claim 8, wherein each of the first driving route and the second driving route comprises at least two switch circuits and a capacitor circuit.

13. The projection apparatus of claim 12, wherein the at least two switch circuits of the first driving route comprise a first switch circuit and a second switch circuit, the capacitor circuit of the first driving route comprises a first storage capacitor, and the first switch circuit is turned on and the second switch circuit is turned off in the data loading phase, and a pixel voltage is latched in the first storage capacitor, and the first switch circuit is turned off and the second switch circuit is turned on in the display phase, and the pixel voltage latched in the first storage capacitor is transmitted to drive a plurality of first subpixel electrodes, wherein the display phase is after the data loading phase.

14. The projection apparatus of claim 13, wherein the at least two switch circuits of the second driving route comprise a third switch circuit and a fourth switch circuit, the capacitor circuit of the second driving route comprises a second storage capacitor, and the third switch circuit is turned on and the fourth switch circuit is turned off in the data loading phase, and the pixel voltage is latched in the second storage capacitor, and the third switch circuit is turned off and the fourth switch circuit is turned on in the display phase, and the pixel voltage latched in the second storage capacitor is transmitted to drive a plurality of second subpixel electrodes.

* * * * *